United States Patent
Fourrey

[11] 3,734,562
[45] May 22, 1973

[54] AUTOMOTIVE SEATS WITH SAFETY HARNESSES

[75] Inventor: Francois Fourrey, Billancourt, France

[73] Assignees: Regie Nationale des Usines Renault, Billancourt; Automobiles Peugeot, Paris, France

[22] Filed: June 28, 1971

[21] Appl. No.: 157,462

[30] Foreign Application Priority Data

Aug. 11, 1970 France..............................7029492

[52] U.S. Cl. ..................297/216, 297/385, 297/386, 297/389
[51] Int. Cl..........................................A62b 35/60
[58] Field of Search.................297/216, 386, 389, 297/385, 378; 280/150 SB; 188/1 C

[56] References Cited

UNITED STATES PATENTS

| | | | |
|---|---|---|---|
| 3,582,133 | 6/1971 | DeLavenne | 297/216 |
| 3,309,137 | 3/1967 | Wiebe | 297/302 |
| 3,186,760 | 6/1965 | Lohr et al. | 297/216 |
| 2,795,266 | 6/1957 | Walther | 297/216 |
| 3,603,638 | 9/1971 | McGregor | 297/216 |
| 3,382,527 | 5/1968 | Strien et al. | 297/378 X |
| 2,953,189 | 9/1960 | Barash | 297/216 |
| 3,269,774 | 8/1966 | Hilderbrandt | 297/386 |
| 3,586,131 | 6/1971 | Le Mire | 297/386 |

*Primary Examiner*—James T. McCall
*Attorney*—Stevens et al.

[57] ABSTRACT

A seat provided with a safety harness, notably for automotive vehicles and of the type comprising a squab, a back provided with at least one anchor point for the shoulder-belt of said safety harness, said anchor point being located on the rear face of said back, an abdominal belt connected to said shoulder-belt, at least one kinetic energy absorption device interposed between said squab and a seat element adapted, in case of crash, to move in relation to said squab, said device being adapted, during this relative movement, to absorb one fraction of the kinetic energy and wherein the anchor point located on said back is connected through said shoulder-belt to the abdominal belt of the safety harness, characterized in that at least one end of said abdominal belt is connected to the seat element movable in relation to the squab during a crash and that said seat element is mechanically connected to said squab in a manner known per se.

8 Claims, 13 Drawing Figures

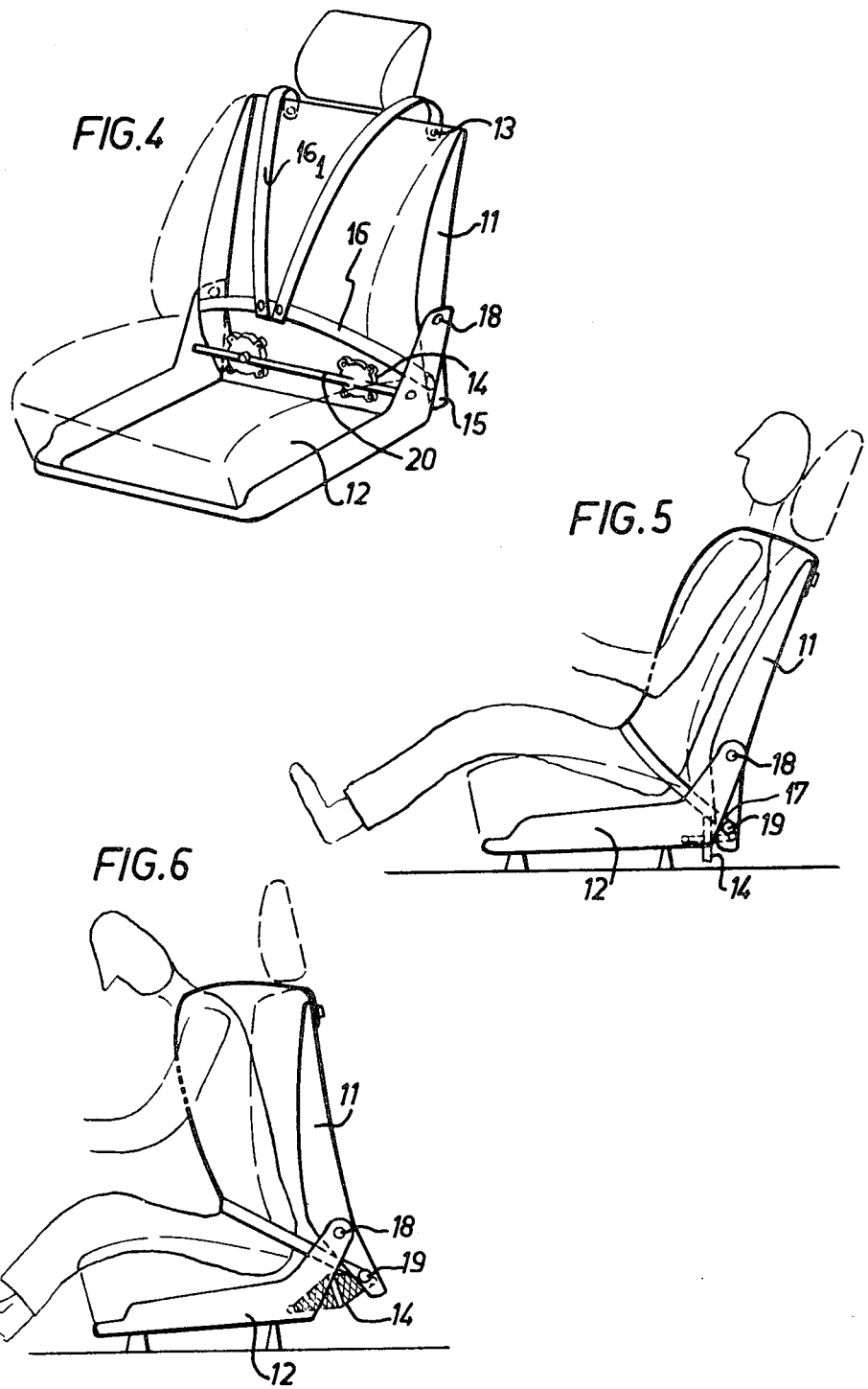

AUTOMOTIVE SEATS WITH SAFETY HARNESSES

The present invention relates to seats equipped with a safety harness, notably for automotive vehicles and, more particularly, to seats of the type wherein the safety harness comprising at least one shoulder-belt or strap and an abdominal belt or waist-belt is constantly attached to the seat or to a member rigidly connected thereto.

This invention is concerned more particularly with a seat of the type set forth hereinabove wherein the anchor points of the safety harness are located on the seat structure behind the main axis of the passenger's body.

A close analysis of the body movements during a crash proved that the passenger's body was not sufficiently retained on his seat. In most instances these movements attain abnormal amplitude values during a crash, and circumstances may arise wherein the belt, failing from properly bearing against the os pubis, is shifted along the body so that the passenger may eventually slip under the belt. Thus, as a consequence of such accidental movements of the passenger under the abdominal belt, serious internal injuries were observed in many cases, due to an abnormal compression of the abdomen.

On the other hand it is known that in certain arrangements intended for retaining the passenger on his seat by means of a safety harness secured to the seat proper, some complementary means must be provided for absorbing kinetic energy during a shock or crash.

In view of the foregoing, it is a first object of this invention to provide between the seat and a safety harness an arrangement designed for properly retaining and holding the passenger in the position warranting his safety in case of crash; in this position the stresses are properly exerted on the passenger's body and minimized due to the use of a kinetic energy absorption device.

Vehicle seats equipped with a safety harness and with means for absorbing kinetic energy, in the form of shock absorbers or the like, are already known in the art. As a rule, these devices are rather elaborate and therefore expensive, and in most instances inadequate for holding the passenger'body in the desired position in case of crash.

Consequently, it is another object of this invention to provide means for limiting the forward movements of the user's truck in case of crash, and to obtain a correct position of the abdominal belt so that it will constantly engage the bony portions of the user's abdomen.

A further object of the present invention consists in providing means for avoiding relative movements of the seat user in relation to the abdominal belt and to obtain an automatic and guided forward inclination of the passenger'trunk in case of crash. A very important consequence of this procedure is that the frequently lethal backward movement of the passenger's head is safely prevented, since the passenger's body remains inclined forwards after a shock or crash.

To this end, the seat equipped with a safety harness according to this invention, which comprises a base structure, a back provided with at least one anchor point for said safety harness, at least one kinetic energy absorption device is interposed between said base structure and a seat element adapted, in case of crash, to move in relation to said base structure so that said device will absorb one fraction of the released kinetic energy, is characterized in that the anchor point on said back is rigid with a belt of the safety harness of which at least one end is connected to said seat element, said seat element being on the other hand mechanically connected to the base structure.

Typical forms of embodiment of the present invention will now be described more in detail by way of illustration with reference to the accompanying drawings, in which:

FIGS. 4, 5 and 6 are views similar to FIGS. 1 to 3, respectively, showing a different structure wherein the safety harness is secured to the adjustable or tilting back of a seat;

Figure 1:
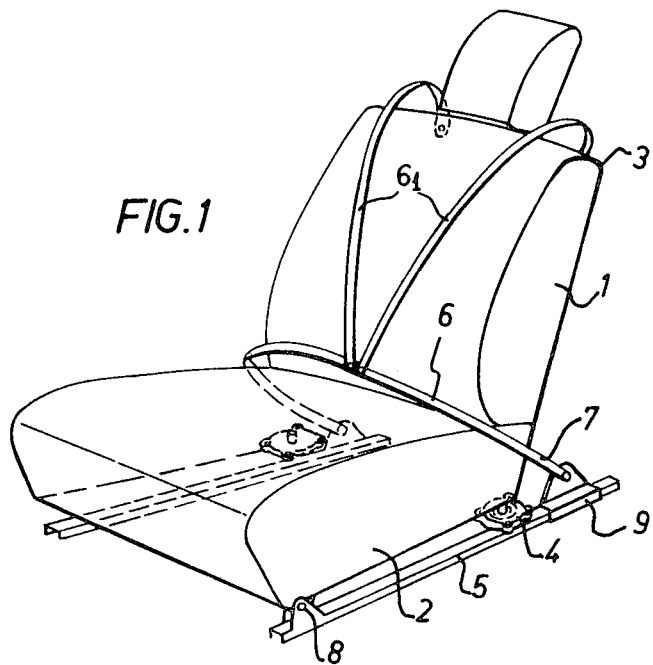
FIG. 1 is a perspective view of a tilting-back seat equipped with a safety harness according to this invention, which comprises an abdominal belt attached to the slide-bars of the seat structure.
Figure 2:
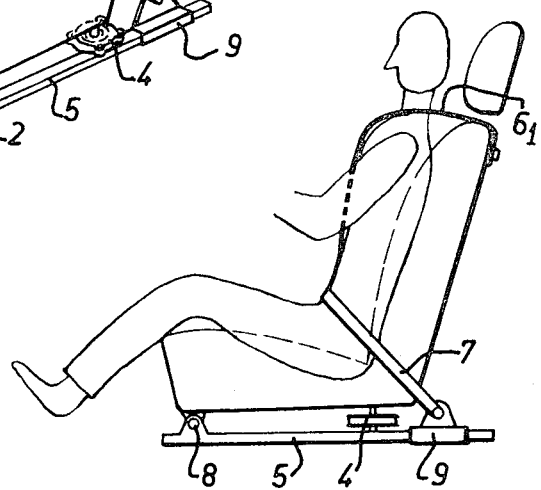
FIG. 2 is a side elevational view showing the seat of FIG. 1, with a passenger in a normal driving position.
Figure 3:
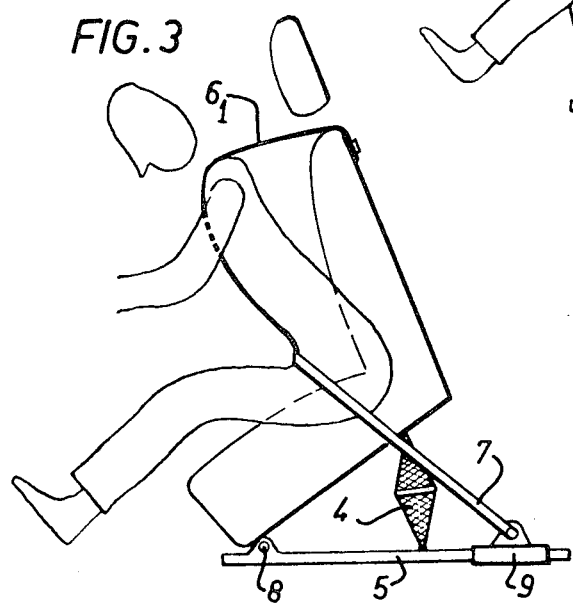
FIG. 3 is a view similar to FIG. 2 but showing the position assumed by the seat and passenger, respectively, during a shock or crash.

Referring firstly to the form of embodiment illustrated in FIGS. 1, 2 and 3 of the drawings, the present invention is shown therein as applied to an adjustable or tilting seat equipped with a safety harness comprising an abdominal belt 6 and a pair of kinetic energy absorption devices 4. The seat proper comprises a back 1 rigidly connected to a base structure or squab 2 adapted to pivot about a transverse pin or rod 8, that is rigid with slide-bars 5 which are movable along suitable guide members (not shown) and connecting the seat to the floor of the passengers' compartment. The safety harness comprises a pair of shoulder-belts or straps $6_1$ attached on the one hand to the back 1 at two anchor points 3, positioned at the rear of the axis of the passenger'body, and on the other hand to the middle of the abdominal belt 6 having its two ends attached to a pair of anchor plates or straps 9 each rigidly connected to one of the slide-bars 5, at two points disposed substantially at the rear of said back 1. Each energy absorption device 4 has two anchor points located on the base structure 2 and on the corresponding slide-bar 5, respectively. This device 4 may advantageously be of the type disclosed in the French Pat. No. 1,568,202.

Figure 12:
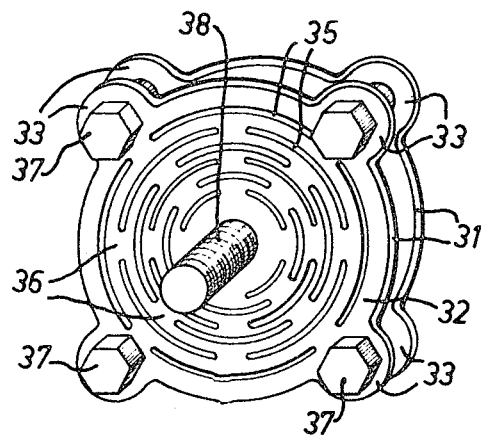
FIG. 12 is a perspective view of a kinetic energy absorption device of a type known per se, incorporated in the safety seat structure according to this invention.
Figure 13:
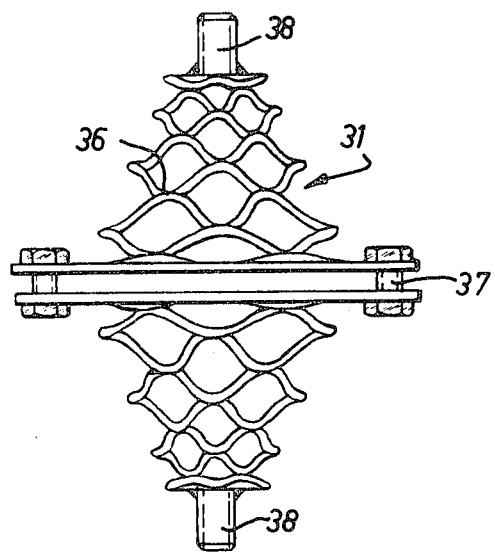
FIG. 13 is a side view showing the device of FIG. 10 after a shock having caused its elongation.

In this form of embodiment and as illustrated in FIGS. 12 and 13 the kinetic energy absorption device 4 (or 14, or 24 in the following forms of embodiment of the harness structure of this invention) comprises a pair of square or circular metal plates 31 provided at their outer periphery with four anchoring lugs 33 and, in their center, with an orifice through which a fastening stud or bolt 38 is inserted.

A plurality of concentric arcuate slots 35 are formed through each plate 31 and centered to the plate axis. These slots are grouped in the form of concentric series of four slots each. Considering the fact that these series are disposed sequentially in the direction from the center to the outer periphery of each plate, the slots 35 of each series are shorter and shifted angularly in relation to those of the next series. By virtue of this shifted arrangement, each plate 31 comprises distortion bridges 36 extending between the slots of one series.

Of course, the metal and thickness of plates 31, the number of slots 35 per series, the length and width of these slots, as well as the number and relative spacing of the series of slots are selected as a function of the magnitude of the kinetic energy which it is desired to absorb by means of this device.

The plates 31 are secured to each other by means of peripheral bolts 37 and the complete device is secured by means of studs or bolts 38 to the base structure 2 and the corresponding slide-bar 5 of the seat, respectively. When efforts tending to modify the relative position of these two elements are applied to this device, notably in case of shock received by the vehicle, the plates 31 will be stressed as shown in FIG. 13, and their distortion will absorb a substantial fraction of the kinetic energy released during this shock. Of course, the kinetic energy absorption device illustrated may be replaced by any other suitable, equivalent means.

Under normal driving conditions the position of the passenger of the vehicle equipped with a seat according to this invention is that shown in FIG. 2. In case of front shock or crash causing a sudden stoppage or deceleration of the vehicle, the passenger is thrown forward and the seat pivots about the transverse axis 8 as shown in FIG. 3. However, the passenger is protected, during the forward movement of his trunk, by the automatic tensioning of the abdominal belt 6 engaging the bony portions of his abdomen and converting the horizontal movement thereof into an upward movement, the seat tilting movement being strongly and gradually retarded by the operation of the kinetic energy absorption device 4 during the relative movement of base structure 2 and slide-bars 5.

It will be noted that the automatic and guided forward inclination of the passenger's trunk and also the use of an energy absorption device preventing the seat from resuming its inoperative position reduce considerably the backward movement of the passenger's head. Finally, the use of two energy absorption devices disposed on either side of the median plane of the seat preserves the transverse stability of the passenger in case of crash.

According to the second form of embodiment illustrated in FIGS. 4 to 6, this invention is applied to a fixed seat having an adjustable back, the safety harness being secured to the back in such a manner that the abdominal belt 16 is duly tensioned. In these figures the different elements are designated by the same reference numerals as in FIGS. 1 to 3, increased by 10; thus, reference numeral 15 designates the seat element adapted to move in relation to the squab 12 and consisting, in this case, of the lower end of the seat back which is pivoted to the squab 12 about an axis 18 disposed above the anchor point 19 of the end 17 of abdominal belt 16. The anchor points of each kinetic energy absorption device 14 lie on a transverse rod 20 rigid with the rear portion of the seat squab and on the lower end 15 of the seat back 11. In case of shock, the forward inclination of the passenger's trunk causes the back to pivot about the rod 18 and therefore the automatic tensioning of the abdominal belt 16 and the operation of the kinetic energy absorption devices, due to the relative movement thus produced between the squab and the lower portion of the back 11.

Figure 7:
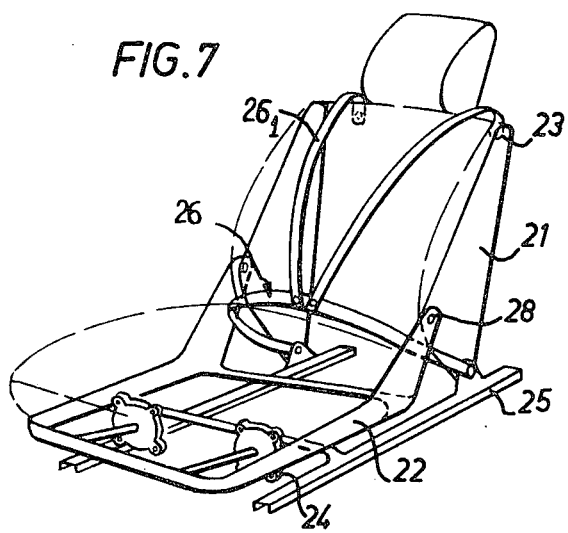
FIGS. 7, 8 and 9 are views similar to FIGS. 1 to 3, in the case of a different structure comprising a safety harness secured to the tilting or adjustable back of a seat.
Figure 8:
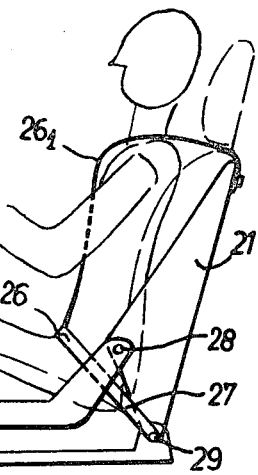
Figure 9:
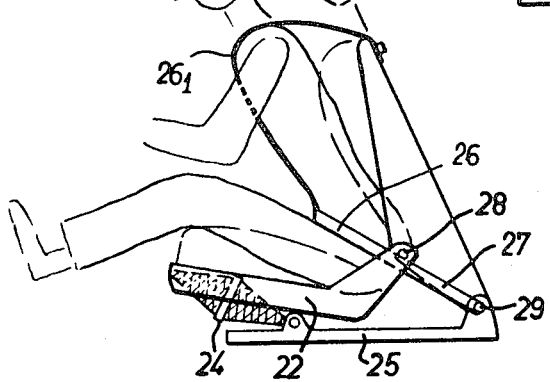

In a third form of embodiment illustrated in FIGS. 7 to 9, this invention is applied to an adjustable-back, movable seat having its safety harness secured to the back so as to tension the abdominal belt 26 by using therefor a slight forward movement of the lower portion of the passenger's trunk. It will also be noted that the various elements of the structure illustrated are designated by the same reference numerals as in FIGS. 1 to 3, plug 20 units, and that the anchor points of the kinetic energy absorption devices 24 are disposed on the front portion of the base structure 22 and slide-bars 25, i.e. nearer to the passenger's feet.

As already described in the foregoing, in case of front shock or crash, the forward inclination of the passenger's trunk (FIG. 9), due to the relative movement produced between the squab and back of the seat, as the latter pivots in relation to the former about the axis 28, is attended by the operation of the kinetic energy absorption devices 24 and also by the automatic tensioning of the abdominal belt 26 as a consequence of the slight forward movement of the pelvis.

Figure 10:
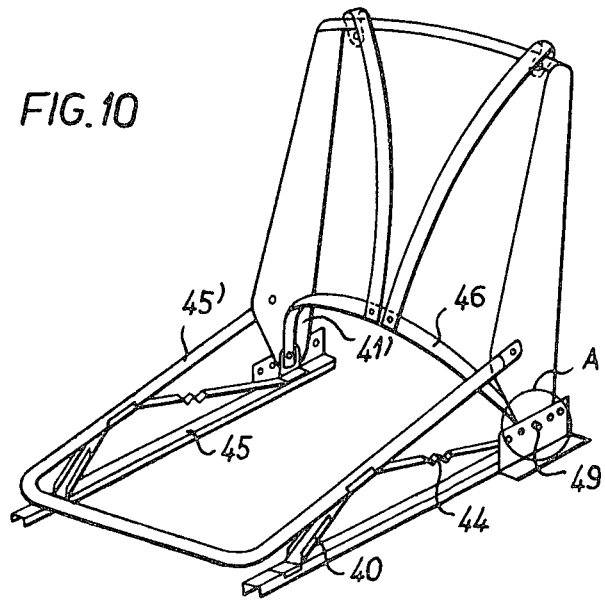
FIG. 10 is a modified form of embodiment of the seat illustrated in FIG. 7.
Figure 11:
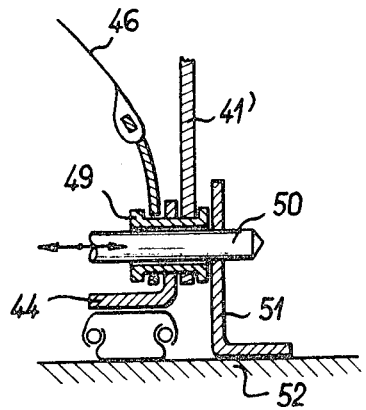
FIG. 11 shows on a larger scale a detail A of the structure of FIG. 10.

In the modified form of embodiment of the invention illustrated in FIGS. 10 and 11 the kinetic energy absorption device 24 is replaced by the extensible diagonal strip 44 (consisting for example of corrugated sheet metal elements) incorporated in a quadrilateral wherein the sides consist of the lateral rear portion 45' of the squab frame, the lower lateral portion 41' of the back, the slide-bar 45 and the front leg 40 of the squab structure.

According to a specific feature characterizing this seat the pivot pin 49 provided for hingedly mounting the back to the slide-bar 45 is coincident with at least one anchor point of the abdominal belt 46 and an anchor point of the kinetic energy absorption device 44.

It will be seen that this pivot pin may advantageously consist of the release or unlocking pin 50 adapted to permit the longitudinal movement of the seat in relation to the anchor plate 51 rigid with the floor or body structure 52 of the vehicle.

Thus, an upward movement of the squab assisting in preventing the accidental movement or shifting of the passenger under the abdominal belt and a particularly economical seat construction are obtained. In fact, the seat will comprise but a reduced number of pivots and relatively short or small-sized slide-bars since the greater part of the stress is supported by the fittings 51.

Of course, this invention should not be construed as being strictly limited by the specific forms of embodiment shown and illustrated herein, which are given by way of example only. More particularly, this invention comprises all means constituting technical equivalents of those described and illustrated and also their combinations contemplated without the scope of the invention as set forth in the appended claims.

What is claimed as new is:

1. A seat, having a safety harness including a shoulder belt, for use primarily in automotive vehicles, comprising a back, having at least one anchor point for the shoulder belt, said anchor point being located on the rear of said back; an abdominal belt, connected to said shoulder-belt, wherein the anchor point located on said back is connected through said shoulder-belt to the abdominal belt; a holder for the abdominal belt, having at least one end of the abdominal belt connected thereto; a squab which is movable in relation to said holder; and kinetic energy absorption means, connected between said squab and said holder, for absorbing a fraction of the kinetic energy when relative movement between the squab and the holder occurs.

2. A seat according to claim 1 wherein the holder to which one end of the abdominal belt is connected comprises a slide-bar through which the seat is adjustably connected to the floor structure of the vehicle.

3. A seat according to claim 1 wherein the holder to which one end of the abdominal belt is connected is positioned near the lower end of the back, said back being pivoted to said squab about an axis located above the point where the holder is positioned.

4. A seat according to claim 2 wherein said kinetic energy absorption means has two connection points located respectively, near front portions of said squab and said slide-bar.

5. A seat according to claim 3, wherein said kinetic energy absorption means is connected near the rear portion of the squab and near the lower portion of the back, respectively, said back being hingedly connected to said squab about said axis.

6. A seat according to claim 2 wherein the kinetic energy absorption means comprises an extensible diagonal strip of a quadrilateral wherein the sides comprise the rear lateral portion of the squab, the lower lateral portion of the back, which lies below the squab plane, the slide-bar and the front leg of said squab.

7. A seat according to claim 6, wherein a pivot axis of said back on said slide-bar is coincident with at least one connection point of said abdominal belt and with a connection point of the kinetic energy a absorption means.

8. A seat according to claim 7, wherein said pivot axis of said back on said slide-bar comprises a seat unlocking pin engaging a fitting rigid with the chassis of the vehicle.

* * * * *